United States Patent
Schwert

(10) Patent No.: US 8,323,445 B2
(45) Date of Patent: Dec. 4, 2012

(54) METHOD FOR LINING A PIPE CONDUIT OR A DUCT

(76) Inventor: Siegfried Schwert, Berlin (DE)

(*) Notice: Subject to any disclaimer, the term of this patent is extended or adjusted under 35 U.S.C. 154(b) by 153 days.

(21) Appl. No.: 12/734,213

(22) PCT Filed: Oct. 24, 2007

(86) PCT No.: PCT/EP2007/009414
§ 371 (c)(1),
(2), (4) Date: Nov. 17, 2010

(87) PCT Pub. No.: WO2009/052850
PCT Pub. Date: Apr. 30, 2009

(65) Prior Publication Data
US 2011/0061807 A1    Mar. 17, 2011

(51) Int. Cl.
*B29C 65/02* (2006.01)
(52) U.S. Cl. .................... 156/275.5; 156/294
(58) Field of Classification Search .............. 156/272.2, 156/275.5, 293, 294, 287, 423; 138/97; 118/306, 118/317; 405/184.1, 184.2
See application file for complete search history.

(56) References Cited

U.S. PATENT DOCUMENTS

| 4,368,091 A | 1/1983 | Ontsuga et al. |
| 7,641,756 B2 | 1/2010 | Schwert |

FOREIGN PATENT DOCUMENTS

| DE | 198 17 413 A1 | 10/1999 |
| FR | 2 724 004 A1 | 3/1996 |
| WO | WO 2004/104469 A1 | 12/2004 |

*Primary Examiner* — Daniel McNally
(74) *Attorney, Agent, or Firm* — Marshall & Melhorn, LLC

(57) ABSTRACT

A process for lining a pipeline, comprising the following steps: pouring in an adhesive, introducing the tube with inversion into the pipeline by applying pressure, providing the conditions for the adhesive situated on the outside of the tube by irradiation using energy-containing waves, and maintaining the internal pressure in the introduced tube until the adhesive is cured, severing the connection between the tube and a retaining strap, which extends through the entire tube in the longitudinal direction thereof, at the end which is at the front in the direction of movement of the tube after the tube has been introduced, coupling the severed end of the retaining strap outside the pipeline to a radiation unit, using the retaining strap to pull the radiation unit, in the non-activated state, through the tube as far as the end thereof which is at the rear in the direction of movement of said tube, pulling the supply cable for the radiation unit into the tube behind said unit, and then using the supply cable to pull the radiation unit, in the activated state, through the tube.

13 Claims, 5 Drawing Sheets

METHOD FOR LINING A PIPE CONDUIT OR A DUCT

BACKGROUND OF THE INVENTION

The present invention relates to a method for lining a pipe conduit or a duct by way of a sealing inner lining with a flexible tubing.

A method for lining the inner surface of a pipe conduit with a flexible-tubing-like lining material whilst using a fluid resin serving as adhesive is disclosed in U.S. Pat. No. 4,368,091. This method comprises the following steps:
a) filling a metered quantity of the resin into the flexible-tubing-like lining material with a uniform distribution over its length,
b) annularly fastening the one end of the lining material containing the fluid resin in its inside, to the one end of the pipe conduit,
c) exerting a pressure onto the lining material with the help of a pressure medium, in a manner such that this is turned inside out at a turning point which is formed behind the fastening location, so that the lining material moves into the pipe conduit and the turning point advances in the movement direction into the pipe conduit, wherein the turned lining material with its surface coated with resin is pressed onto the inner surface of the pipe conduit, and
d) maintaining the pressure by the medium, until the resin is cured.

With these known methods, one strives to use as long as possible flexible tubings as lining materials, so that one needs only to create as few as possible access possibilities to the inside of the pipe conduit or of the duct. Thus it is already possible to introduce flexible tubings of more than 500 m length into the pipe conduits or ducts. This however is a multi-hour procedure, wherein the filling and distribution of the adhesive alone (about 1000 kg with a normal diameter of DN 300 and a renovation length of 600 m) demands more than an hour and the average advance speed of the flexible tubing is about six meters per minute. The applied adhesive must be well workable up to the completion of the lining pressure, i.e. have a pot time (duration of the workability) of several hours.

The curing time with cold curing is usually at least fivefold the pot life, so that the pressure medium must remain in the flexible tubing for more than a complete day, until the adhesive has been adequately cured. Since with the renovation of a pipe conduit or of a duct effected in this manner, the normal operation must be interrupted for this duration, this entails significant operational limitation. A shortening of the curing time by way of heating the pressure medium requires some effort and is a problem at least with a renovation of pipe conduits of steel, inasmuch as the pipe conduit should not be heated to temperatures greater than 30° C., since otherwise breakage of the welding seam may occur due to thermal stresses, and outer bituminous corrosion encasings may be damaged. Technical difficulties which may hardly be overcome at all occur with pipe conduits of large lengths and large diameters.

Basically however, by way of shortening the curing time, pipe conduits should be taken out of operation, cleaned, lined with the flexible tubing and put back into operation again in one day. With this, one may make do without emergency conduits for maintaining the supply, which require effort and are expensive.

For this reason, a method is known from U.S. 2006/0254711 A1, with which the filled adhesive firstly has a long curing time, after introduction of the flexible tubing into the pipe conduit however is subjected to a radiation with UV-rays, IR-rays microwaves and/or ultrasound, by way of which it cures in a shorter time. For this, at least one radiation unit in the activated condition is pulled through the introduced flexible tubing, which is pressed by way of an adequate inner pressure onto the inner wall of the pipe conduit. This may be effected in a manner such that firstly the flexible tubing is introduced into the pipe with a speed which is controlled by a retaining strap led through the inside of the flexible tubing, after the introduction, the connection of the flexible tubing to the retaining strap is separated at the end which is at the front in the movement direction of the flexible tubing, the radiation unit is coupled to the separated-away end of the retaining strap and in the activated condition is pulled by way of the retaining strap through the flexible tubing to its end which is at the rear in the movement direction. Thereby, the retaining strap is pulled from the rotation drum which is envisaged for the flexible tubing, before its introduction into the pipe conduit and is wound onto this.

This method however has the disadvantage that the rotation drum usually has no controllable winding up speed. This however is absolutely necessary, in order to achieve the desired degree of curing of the adhesive which is dependent on the radiation duration. A later retrofitting of the rotation drum for a controllable winding-up speed on the other hand requires some effort, since the rotation drum has considerable dimensions and must be built in a sturdy manner. This results from the fact that it must receive and wind-off a flexible tubing with filled-in plastic, with a length of several hundred meters. Moreover, given a constant winding-up rotational speed, the pull speed changes during the winding up procedure due to the change of the winding diameter.

Moreover, the danger may exist that as a result of an unforeseen narrowing of the free pipe cross section, the radiation unit remains stuck in the pipe and may not be pulled any further. One must then locate the narrowed location and an external entrance to the tube must be created, and the pipe must be opened from the outside, in order to recover the radiation unit and subsequently repair it. This is an extremely tiresome and expensive procedure.

BRIEF SUMMARY OF THE INVENTION

It is therefore the object of the present invention to improve the known method such that a common rotation drum whose winding up speed is not controllable, may be used and such that a radiation unit may be recovered without any problem in the case that this should get stuck.

According to the invention, this object is achieved by a method with the features of claim 1. Advantageous further formations are to be deduced from the dependent claims.

Due to the fact that the connection between the flexible tube and a retaining strap running through the complete flexible tubing in its longitudinal direction is separated at the end which is at the front in the movement direction of the flexible tubing, after the introduction of the flexible tubing, that the separated-away end of the retaining strap is coupled to the at least one radiation unit outside the pipe conduit, that the at least one radiation unit in the non-activated condition is pulled by way of the retaining strap through the flexible tubing up to its end which is at the rear in its movement direction, wherein the supply cable for the at least one radiation unit is pulled in behind this into the flexible tubing over the whole length of this, and that thereafter the at least one radiation unit in the activated condition is pulled through the tube over its mentioned length by way of the supply cable, the rotation drum pulls the radiation unit in its non-activated condition through the flexible tubing, such that the speed of the radiation unit is insignificant. If the radiation unit is activated, then with regard to this, it is pulled by way of the supply cable by its cable drum, whose winding-up speed may usually be controlled and which is also essentially smaller than the rotation drum for the flexible tubing. If the radiation unit is pulled through the flexible tubing by way of the retaining strap, it is also connected to its supply cable. If it gets stuck in the flexible tubing and may not be pulled further by the retaining strap, they it may be pulled out of the flexible tubing in the opposite direction by way of the supply cable.

BRIEF DESCRIPTION OF THE DRAWINGS

The invention is hereinafter explained in more detail by way of one embodiment example represented in the FIGS. 1 to 5. This shows the course of the method in five consecrate steps.

DETAILED DESCRIPTION OF THE INVENTION

Figure 1:
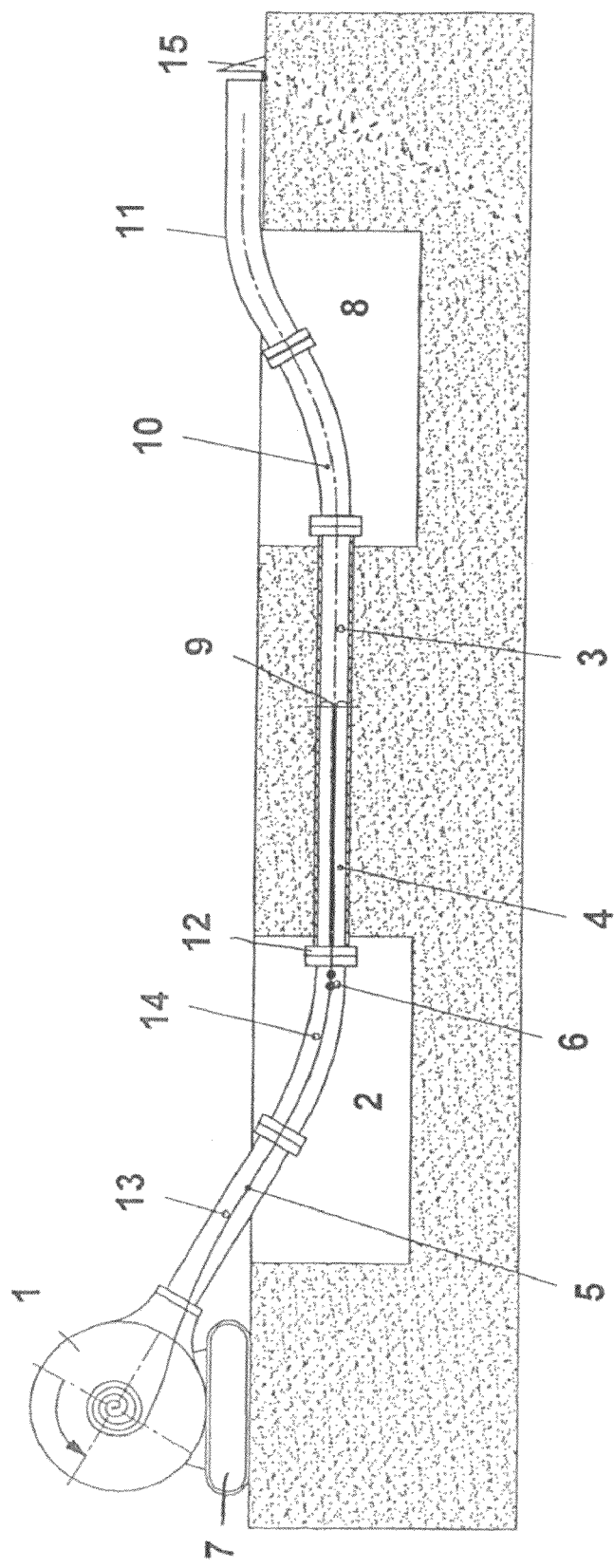

As is evident from FIG. 1, a mobile rotation drum 1 is located in the direct proximity of a construction pit for a pipe conduit 3 to be renovated. A fabric flexible tubing 4 with a length of up to 500 m, which in its inside contains a metered quantity of adhesive which is either slow in curing or is located in a condition in which no curing take place, is located in the rotation drum 1 in the wound-up condition at the beginning of the renovation procedure. Furthermore, a likewise wound-up retaining strap 5 of about the same length connects to the fabric flexible tubing, and these are coupled to one another via a connection piece 6. An air compressor 7 is connected to the rotation drum 1 and in this produces a pressure which is increased with regard to the atmosphere.

The pipe conduit 3 which consists of metal, preferably steel, grey cast iron or ductile grey cast iron, plastic, preferably PVC or GFP (glass-fibre-reinforced plastic), or mineral material, preferably asbestos cement, stoneware, fibre cement, concrete, steel concrete or masonry, runs out at the end which is opposite to the construction pit 2, into a target pit 8.

A reversal head 12 is attached at the end of the pipe conduit 3, which projects into the construction pit 2. Successively, a transport flexible tubing 12, through which the fabric flexible tubing 4 and subsequently the retaining strap 5 are led on introducing the fabric flexible tubing, as well as an intermediate flexible tubing 14, are located between the rotation drum 1 and the reversal head 12.

It is also possible to invert (turn inside out) the fabric flexible tubing 4 directly out of the rotation drum 1. The reversal head 12 is then located directly on the rotation drum 1 and the transport flexible tubing 13 and the intermediate flexible tubing 14 are done away with.

At the beginning of the renovation procedure, the free end of the wound-up fabric flexible tubing 4 is pulled through the transport flexible tubing 13 and the intermediate flexible tubing 14, up to the reversal head 12 and fastened on this. Then the pressure in the rotation drum, the transport flexible tubing 13 and the intermediate flexible tubing 14 is increased by way of the air compressor 7, so that the fabric flexible tubing 4 in the braked free-wheel is wound of from the rotation drum 1 and amid inversion is pressed into the pipe conduit 3. The adhesive located in the inside of the flexible tubing thereby gets to the outer side of the fabric flexible tubing 4 which bears on the inner surface of the pipe conduit 3.

Figure 2:
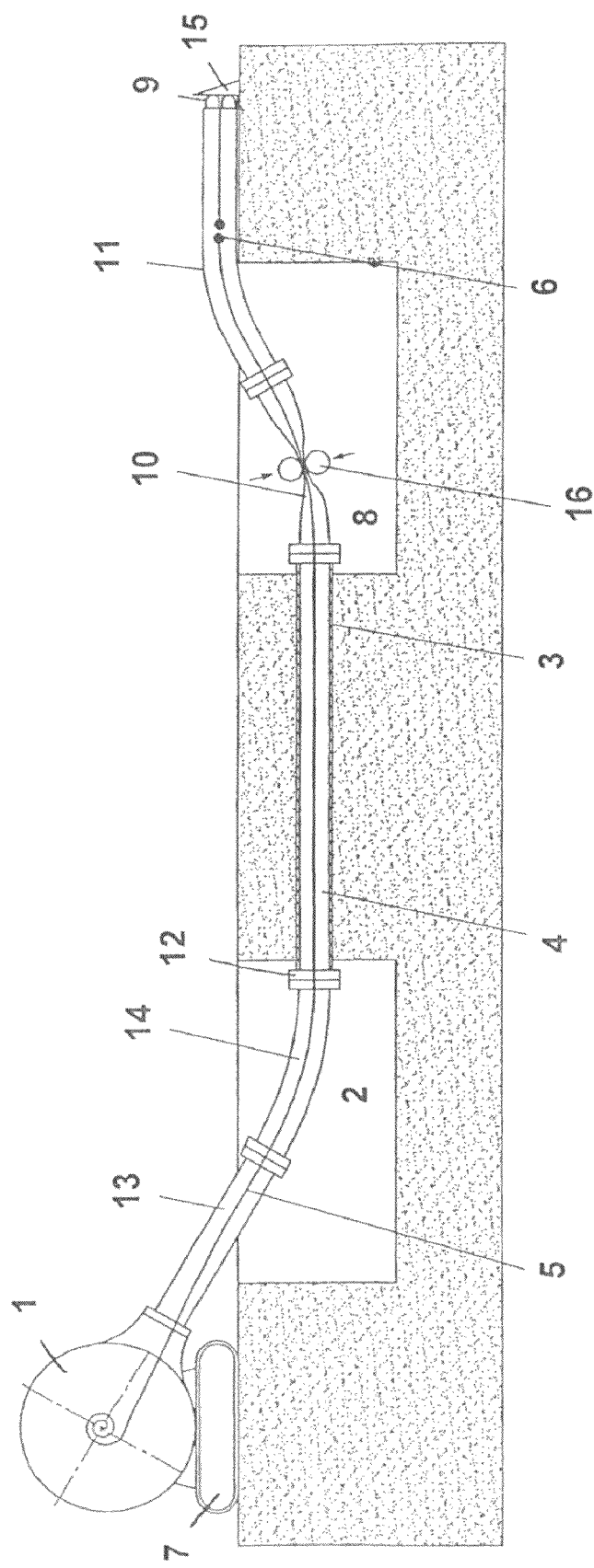

The end 9 (travelling turning point) of the fabric flexible tubing 4, which is at the front in the movement direction, moves through the pipe conduit 3 as is shown in FIG. 1, and gets to the end of the pipe conduit 3 which projects into the target pit 8, so that this pipe conduit 3 is lined with the fabric flexible tubing 4 over its whole length. The fabric flexible tubing 4 however is inverted into a clamping flexible tubing 10 connected to the pipe conduit 3 as well as subsequently into a protective flexible tubing 11 coupled to the clamping flexible tubing 11, until the connection location 6 between the fabric flexible tubing 4 and the retaining strap 5 gets into the accessible region of the protective flexible tubing 11 and as the case may be its front end 9 is received in a collecting basket 15 serving as a counter bearing (FIG. 2).

The clamping flexible tubing 10 is provided with a clamping-off device 16, which is closed, after the flexible tubing end 9 has reached the collecting basket as the case may be (FIG. 2), so that the flexible tubing end 9 may be subsequently opened without, despite the retaining strap 5 led through the fabric flexible tubing 4, the pressure in the part of the fabric flexible tubing 4 which is located in the pipe conduit 3, from dropping.

The protective flexible tubing 11 may now be decoupled from the clamping flexible tubing 10. Also the connection piece 6 is opened or removed, so that the coupling between the fabric flexible tubing 4 and retaining strap 5 is lifted.

The end of the cut-off fabric flexible tubing 4 which projects out of the clamping flexible tubing 10 is connected in a pressure tight manner to the free flange end of the clamping flexible tubing 10, by way of a clamping piece.

Figure 3:
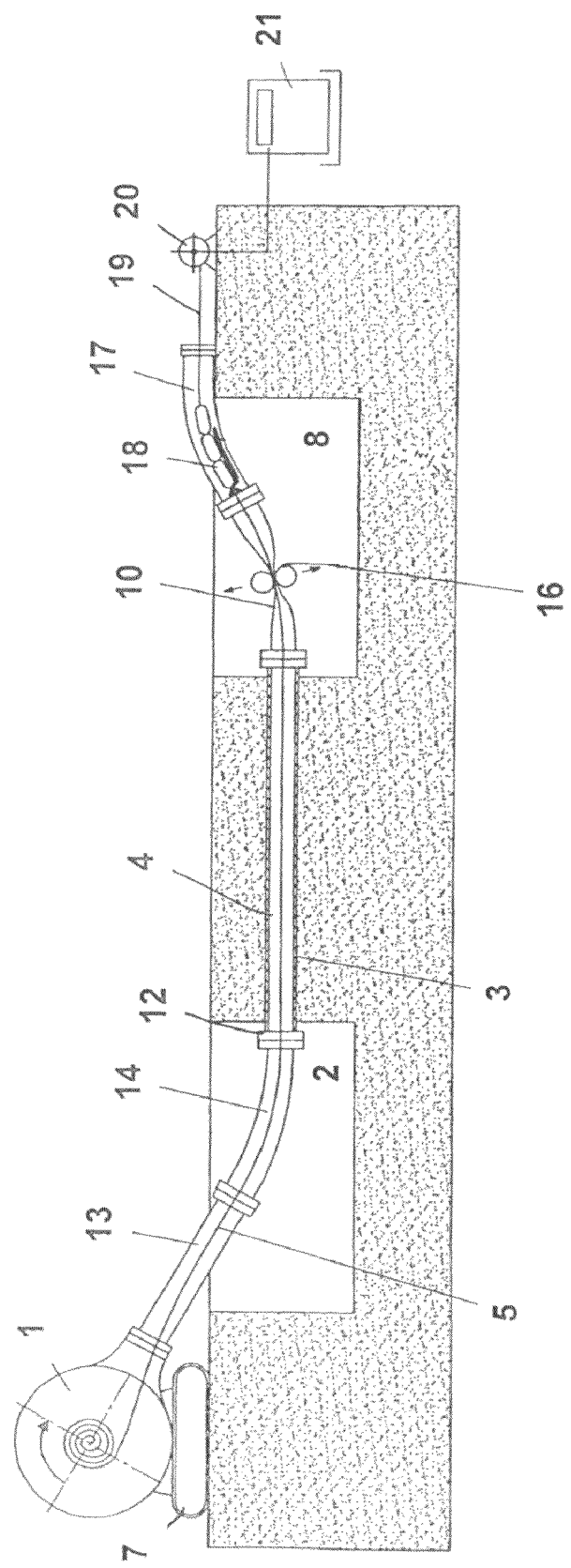

Now a lock flexible tubing 17, in which a radiation unit is located (FIG. 3) is coupled onto the clamping flexible tubing 10. This unit for example is designed in a three-part manner, and consists of a television camera, a UV-radiator and an IR-radiator. The radiation unit 18 is coupled to the free end of the retaining strap 5, and the flexible tubing 17 is then closed, wherein the supply cable 19 for the radiation unit 18 is led out of the lock flexible tubing 17 in a pressure-tight manner and led to a cable winch 20. The cable winch 20 is connected to a control unit 21 and may be controlled such that the supply cable 19 may either be wound off in a free-wheel or may be wound up with a settable speed.

The clamping-off device 6 is subsequently opened, wherein the inner pressure in the fabric flexible tubing 4 is maintained as a result of the air-tight closing-off of the lock flexible tubing 17. The rotation drum 1 may now wind up the retaining strap 5 with a constant rotation speed which is set by the drive, wherein the radiation unit 18 and the connected supply cable 19 are also pulled along. The UV-radiator and the IR-radiator of the radiation unit 18 are switched off, so that the winding up speed of the rotation drum 1 may be infinite. The television camera led along with the radiation unit 18 may however be switched on.

Figure 4:
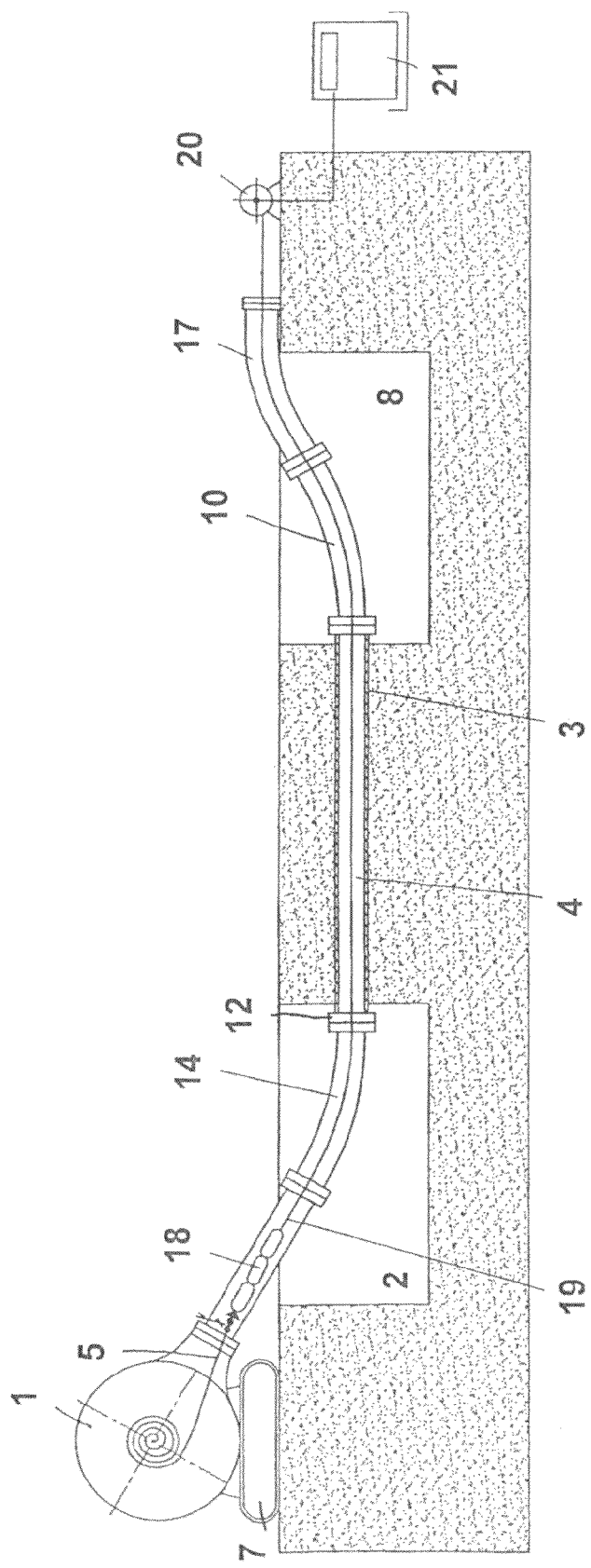

When the radiation unit 18 has arrived in the transport flexible tubing 13 (FIG. 4), the winding up drive of the rotation drum 1 is switched off. The coupling between the retaining strap 5 and the radiation unit 18 may be lifted. This may however only be effected whilst maintaining the pressure in the fabric flexible tubing 4. This decoupling may take place since one no longer fears the radiation unit 18 getting stuck.

Figure 5:
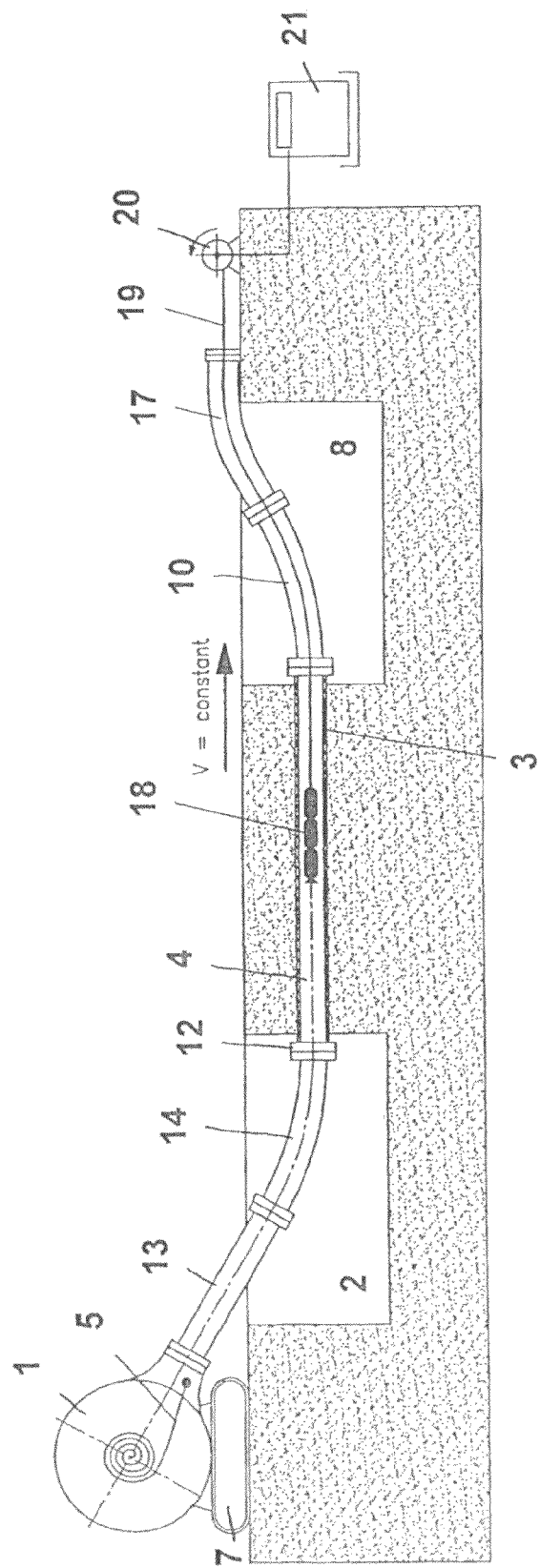

As is shown in FIG. 5, the radiation unit 18, subsequently with a switched-on UV radiator and IR-radiator, is pulled back by the cable winch 20 via the supply cable 19, to the target construction pit 8. The winding up speed of the cable winch 20 is controlled by a control unit 21 such that the desired degree of curing of the adhesive is maintained between the outer side of the fabric flexible tubing 4 and the inner side of the pipe conduit 3. The inner pressure in the fabric flexible tubing 4 is maintained until the radiation unit 18 gets into the target construction pit 8. The adhesive then over the whole length of the pipe conduit 3 is cured at least to the extent that it firmly holds the fabric flexible tubing 4 on the pipe wall. The inner pressure in the fabric flexible tubing 4 is no longer necessary, so that the device may be disassembled.

The invention claimed is:

1. A method for lining a pipe conduit or a duct by way of a sealing inner lining with a flexible tubing which consists of a coated fabric, knitted fabric, braiding, felt, non-woven or fleece, and which sticks to an inner wall of the pipe conduit or duct by way of adhesive, which comprises the steps:

filling a metered quantity of an adhesive, under conditions in which a curing of the adhesive does not take place, into the flexible tubing with a uniform distribution over the flexible tubing length, introducing the flexible tubing into the pipe conduit or the duct, wherein one end of the flexible tubing is firmly held at the end of the pipe conduit or the duct, which is at the rear in a movement direction of the flexible tubing, and the flexible tubing is introduced into the pipe conduit or into the duct by way of pressure impingement whilst inverting, creation of conditions for the adhesive that, after inversion, is located on the outer side of the flexible tubing, in order to cure the adhesive in a short time, by way of irradiating by way of energy-containing waves, wherein at least one radiation unit is pulled through the introduced flexible tubing in the axial direction, and maintaining the inner pressure in the introduced flexible tubing, in order to press this onto the inner wall of the pipe conduit or the duct, until the adhesive between the flexible tubing and the inner wall of the pipe conduit or of the duct is cured, wherein after introducing the flexible tubing, a connection between the flexible tubing and a retaining strap running through the whole flexible tubing in its longitudinal direction, is separated at the end which is at the front in the movement direction of the flexible tubing, the separated-away end of the retaining strap is coupled outside the pipe conduit to the at least one radiation unit, the at least one radiation unit in a non-activated condition is pulled by way of the retaining strap through the flexible tubing up to its end which is at the rear in the movement direction, wherein a supply cable for the at least one radiation unit is pulled behind the at least one radiation unit over the complete length of the flexible tubing into this, and thereafter, the at least one radiation unit in an activated condition is pulled by way of the supply cable through the flexible tubing over its complete length.

2. The method according to claim 1, wherein a rotation drum which is envisaged for winding up the flexible tubing and with a fixed winding-up rotation speed and braked freewheel when winding-off, is used for the pulling of the at least one radiation unit in the non-activated condition through the flexible tubing.

3. The method according to claim 2, further comprising pulling the at least one radiation unit in the activated condition through the flexible tubing, using a cable winch which is envisaged for winding-up of the supply cable, with a winding-up speed, which may be controlled and/or regulated and with a free-wheel on winding off.

4. The method according to claim 2, wherein a part of the flexible tube which is located in the pipe conduit is clamped off in a air-tight manner with respect to a coupling location, for coupling the at least one radiation unit onto the retaining strap.

5. The method according to claim 2, wherein after pulling the at least one radiation unit in the non-activated condition through the flexible tubing by way of the retaining strap, the radiation unit is decoupled from the retaining strap.

6. The method according to claim 1, wherein a part of the flexible tube which is located in the pipe conduit is clamped off in a air-tight manner with respect to a location, for coupling the at least one radiation unit onto the retaining strap.

7. The method according to claim 6, wherein after the coupling of the at least one radiation unit to the retaining strap, the end of the flexible tubing which is at the front in the movement direction, is closed again in an airtight manner amid the inclusion of the at least one radiation unit, and the clamping-off of the part of the flexible tubing which is located in the pipe conduit, is lifted.

8. The method according to claim 7, wherein after pulling the at least one radiation unit in the non-activated condition through the flexible tubing by way of the retaining strap, the radiation unit is decoupled from the retaining strap.

9. The method according to claim 6, wherein after pulling the at least one radiation unit in the non-activated condition through the flexible tubing by way of the retaining strap, the radiation unit is decoupled from the retaining strap.

10. The method according to claim 1, further comprising pulling the at least one radiation unit in the activated condition through the flexible tubing, using a cable winch which is envisaged for winding-up of the supply cable, with a winding-up speed, which may be controlled and/or regulated and with a free-wheel on winding off.

11. The method according to claim 10, wherein the part of the flexible tube which is located in the pipe conduit is clamped off in a air-tight manner with respect to the coupling location, for coupling the at least one radiation unit onto the retaining strap.

12. The method according to claim 10, wherein after pulling the at least one radiation unit in the non-activated condition through the flexible tubing by way of the retaining strap, the radiation unit is decoupled from the retaining strap.

13. The method according to claim 1, wherein after pulling the at least one radiation unit in the non-activated condition through the flexible tubing by way of the retaining strap, the radiation unit is decoupled from the retaining strap.

* * * * *